United States Patent [19]
Grigsby et al.

[11] Patent Number: 5,681,641
[45] Date of Patent: Oct. 28, 1997

[54] STRUCTURAL MEMBER AND PALLET MADE THEREWITH AND METHOD

[75] Inventors: John M. Grigsby, Marietta; Jeffrey C. Banks, Austell; John M. Grigsby, Jr., Atlanta, all of Ga.

[73] Assignee: North American Container Corporation, Mableton, Ga.

[21] Appl. No.: 667,373

[22] Filed: Jun. 21, 1996

Related U.S. Application Data

[63] Continuation of Ser. No. 198,504, Feb. 18, 1994, abandoned, which is a continuation-in-part of Ser. No. 66,342, May 24, 1993, Pat. No. 5,520,982.

[51] Int. Cl.⁶ .................. B37B 3/28; A47B 13/08
[52] U.S. Cl. ............... 428/182; 428/72; 428/76; 428/184; 428/186; 428/218; 52/783.11; 52/783.18; 52/729.1; 52/729.3
[58] Field of Search .................. 428/182, 184, 428/186, 120, 72, 76, 192, 218, 537.1; 248/346; 52/783.11, 783.18, 729.1, 729.3; 108/51.3

[56] References Cited

U.S. PATENT DOCUMENTS

| | | | |
|---|---|---|---|
| 1,619,011 | 3/1927 | Agar | 428/182 |
| 1,955,833 | 4/1934 | Romanoff | 20/91 |
| 2,432,295 | 12/1947 | Donahue | 108/51.3 X |
| 3,092,046 | 6/1963 | Davidson | 108/51.3 |
| 3,743,568 | 7/1973 | DeWolf | 428/182 |
| 3,929,536 | 12/1975 | Maughan | 156/85 |
| 3,982,057 | 9/1976 | Briggs et al. | 108/51.3 X |
| 4,319,530 | 3/1982 | Moug | 108/56.1 |
| 4,399,972 | 8/1983 | McCulloch | 108/51.3 X |
| 4,424,753 | 1/1984 | Eatherton | 108/51.1 |
| 5,076,176 | 12/1991 | Clasen | 108/51.3 |
| 5,218,913 | 6/1993 | Winebarger et al. | 108/56.1 X |
| 5,320,048 | 6/1994 | Feiner | 108/51.3 X |
| 5,386,786 | 2/1995 | Kilpatrick et al. | 108/51.3 |
| 5,433,156 | 7/1995 | Hutchison | 108/56.1 X |
| 5,461,988 | 10/1995 | Cummings et al. | 108/51.3 |

FOREIGN PATENT DOCUMENTS

| | | | |
|---|---|---|---|
| 4314504 | 12/1993 | Germany | 108/51.3 |
| 7710020 | 4/1979 | Sweden | |
| 2127773 | 4/1984 | United Kingdom | 108/51.3 |

OTHER PUBLICATIONS

Eco Pallet Brochure –Undated Ecological Pallets, Limited, 8210 South Nogales Hwy., Tucson, AZ 85706.
June 5, 1993 –Official Board Markets "GM Touts Sonoco Corner Supports".
New Pallet Concepts –Mar. 21, 1994 Houston Business Profile p. 23.

*Primary Examiner*—Donald Loney
*Attorney, Agent, or Firm*—Kennedy, Davis & Kennedy

[57] ABSTRACT

A structural member formed from a billet, each member comprising a plurality of corrugated paperboard sheets bonded together with an adhesive and disposed between a core fiber layer, each core fiber layer comprising at least one ply of a fiberboard sheet, a pair of caps of a solid fiberboard sheet bonded to respective side faces of the paperboard sheet and to the respective edges of the core fiber layers. A method of manufacture is disclosed in which the billet is built up of corrugated paperboard sheets. The billet is then ripped into planks for use as a plank, board, or cleat, particularly as components for corrugated paperboard containers. A pallet made of planks and a pallet made of planar sheets cut from the billet are disclosed.

1 Claim, 12 Drawing Sheets

STRUCTURAL MEMBER AND PALLET MADE THEREWITH AND METHOD

This application is a continuation of application Ser. No. 08/198,504 filed Feb. 18, 1994 now abandoned which is a continuation-in-part of application Ser. No. 08/066,342 filed on May 24, 1993 now U.S. Pat. No. 5,520,982.

TECHNICAL FIELD

The present invention generally relates to containers for articles. More particularly, the present invention relates to a structural member for making components of containers, to a pallet made of such structural members, and a method for making the structural members.

BACKGROUND OF THE INVENTION

Many types of manufactured goods must be packaged in containers for warehouse storage at the manufacturer's plant and for shipment by truck or rail car to a customer or to an intermediate distribution center. Often these manufactured goods are heavy and bulky, such lawn and garden tractors, outboard motors, large electrical motors, refrigerators, stoves, central air conditioners and heating units, and the like.

The container for these goods serves the functions of protecting the article from damage and providing a structure for handling and transporting the goods. The container for such large and heavy goods must have sufficient structural strength to allow the goods to be handled and to be stacked five or six containers high in a warehouse. Stacking saves warehouse space and associated freight shipping costs. For example, garden tractors typically weight up to 500 pounds each and typically are between forty-eight and sixty inches long. One manufacturer produces over 2000 tractors per day. The manufacturer must be able to place at least six of the tractors in a stack to reduce the required warehouse space for handling this large volume of production.

In the case of odd-shaped goods such as lawn tractors, outboard motors, electric motors, and the like, the goods themselves typically have no natural top or wall that allows the inherent strength of the goods to assist in stacking. The container itself therefore must possess sufficient strength in its sidewalls to allow several thousand pounds of package goods to be stacked on top of the lower-most container. It is standard procedure in the packaging industry to design such structural containers with adequate safety factors to insure that stacks of goods do not collapse due to stress in stacking and due to environmental changes such as conditions of high heat and humidity. Corrugated paperboard, for instance, may lose up to 50% of its stacking strength during conditions of high humidity when the paper liners and medium composing the corrugated board absorb atmospheric moisture. It is typical to design a container with a safety factor of 4-to-1 or 4.5-to-1 times the actual calculated load on the bottom container. For example, garden tractors weighing 325 pounds are to be stacked six high. The bottom container carries the load of five containers and tractors. The load equals 5 times 325 pounds, or a total of 1625 pounds impressed upon the lowermost container in the stack. Using a 4-to-1 safety factor, the container for these goods would need to have a top load compression strength of 6500 pounds.

In addition, containers are stacked in tractor trailers or rail cars transporting the goods. It is often desirable to stack goods two, three, or four containers high depending on the physical height of the container and the inside height of the truck trailer or rail car. Stacking saves space and reduces freight costs per container. Transit by truck or rail car however places great torque or twisting forces on the lower containers in a stack. These forces arise from road shocks, stops, starts, and cornering. The container therefore must have sufficient structural strength so as not to collapse in transit. In addition, handling of containers by forktruck or squeeze (clamp) truck exerts extreme force on the bottoms and side walls of the containers carrying heavy items. Such handling is often rough and at a fast pace. It is not uncommon for such containers to be handled many times through a distribution cycle and the container must be rugged enough to withstand this repetitive handling.

To meet the need for packaging heavy, large goods, various containers have been developed and used. These include wooden crates and corrugated packages. Wooden crates include wood-sided boxes and wire-bound wooden boxes. Wooden boxes are expensive, heavy and bulky, and are difficult to assemble on a manufacturing line. Corrugated packages include all-corrugated containers and wood reinforced corrugated containers. The all-corrugated packages include internal corrugated paperboard rollups that form corner posts for compression strength.

Wood reinforced corrugated containers however are the choice for many manufacturers of these large and heavy goods. One such container is described in United States Pat. No. 4,832,256 issued to Grigsby. Wood members called cleats are fixed to the sidewall of the corrugated paperboard body of the container. The cleats provide support and bracing for stacking, handling and shipment of the container as described above. The width and thickness of the wood cleats are designed to provide the desired performance characteristics of the container with the specified safety factor, as discussed above. Typically, a large container such as for a garden tractor or outboard motor would utilize one cleat fixed vertically near each corner of the container. Other vertical cleats for stacking strength are often located centrally on the other length or width panels of the body of the container. These central cleats provide additional support. A wooden base or pallet is typically provided on which the product to be packaged is fixed, either by chocking, banding, or combination. A wooden top frame often is also provided, which rests on the upper ends of the vertical wood cleats. The top frame forms a reinforced upper surface that spreads or distributes the load of other containers stacked on top. The top frame further protects the goods in the container from damage, for example, preventing a smaller package placed on top from falling through during transit.

There are many advantages of wood reinforcement cleats for corrugated containers. Wood is extremely strong on a weight basis, and is easily machinable with standard cutting, ripping and tenoning machines. Tenoning machines cut special notches or extensions which mate with a recess, called a mortise, to form a locking joint in a wood frame. Wood will not lose its strength in conditions of high heat and humidity as does corrugated paperboard. Wood however, has several major disadvantages. Increasing environmental awareness has become a factor in container design and use. Wood is difficult to readily recycle, and hence many wood packaging components are finally disposed in landfills. Available landfill sites however are becoming full and are being closed. If landfill disposal is available, fees for dumping such bulky materials are increasing. Many customers of manufacturers of the heavy durable goods described above therefore are demanding fully recyclable packaging. In response, the recycling industry has increased the number and locations of processing mills where corrugated containers are re-pulped to form new rolls of recycled liner board.

In addition, wood supplies are limited and this causes the price of wood to increase. Cutting boards for packaging wood requires harvesting of old growth, large trees, which are more importantly needed for construction lumber. Corrugated paperboard and solid fibreboard is made from pulp wood which are typically small trees rapidly grown on managed tree farms. Wood residue from sawmills and wood-using industries also can be ground up and pulped into kraft paper for solid fibre and corrugated paperboard.

Corrugated paperboard by itself, however, does not have the necessary strength to replace wood in heavy structural uses, such as the packaging requirements desired above.

Tubes of corrugated paperboard and of fibreboard have been manufactured and used as vertical cleats in containers. Typically these tubes are circular or is triangular in cross-section. Corrugated paperboard formed with relatively thin paper liners and fluted mediums, so the density of corrugated paperboard is low compared to wood in a given sized member. The associated compression and bending strength of a paperboard cleat is significantly less than with a wood member. Therefore, a large number of scored and folded forms are necessary to provide a container with sufficient top load compression strength to replace a wood cleat. The size and cost of such numerous forms typically are not competitive with wood. The goods may also have dimensional constraints that limit the placement and size of the support forms. An increased number of corrugated columns and the internal dimension constraints may require an excessively large container to hold the goods and the support forms. It is always desirable, however, to keep the outside dimensions of the container as small as possible, so that freight and storage costs can be minimized. If the product to be packaged is of such a shape as to fit relatively tightly into the corners of the container, then a large corner column cleats may not be allowed. One example of this is the wheels of a lawn tractor fitting closely into the corners of the container. The container would have to be larger to accommodate the goods and the support forms.

The articles and containers discussed above often are secured to pallets for transportation, handling, and storage. A pallet is a portable platform for handling, storing, or moving materials and packages as in warehouses, factories, or vehicles. The pallet includes bottom supports called baseboards, bottom boards, or bottom deck boards. These are identified as baseboards in this application. Cross-members known as stringers are disposed transverse to the baseboards. The stringers connect to the baseboards. Deck boards connect to an upper surface of the stringers to provide a surface on which articles and containers are placed. The height of the stringers defines a space between the baseboards and the deck boards for inserting the extended blades of a forklift truck.

Pallets typically are made of wood. Wood is a sturdy material that withstands handling and shipping over relatively long periods. Wood provides a pallet with a long useful life. However, wood pallets are heavy and can become damaged. For example, baseboards, stringers, and deck boards can be broken. A damaged pallet may still be useful for some loads. Typically companies that use pallets have a storage yard for empty pallets. The pallets are sorted before re-use to cull the damaged pallets from inventory. Damaged pallets can be repaired; irreparable pallets are discarded, often in land fills. Costs for the wood to make the pallets are increasing and the available supply of wood is decreasing. Disposal costs for pallets also is increasing.

Accordingly, there is a need in the art for an improved pallet made of a structural member for use with transporting, handling, and storing containers and goods.

SUMMARY OF THE INVENTION

The present invention provides an improved structural member for making components used in containers, including a pallet, for heavy goods, and provides a method of manufacturing such structural member. Generally described, the structural member comprises a low density core preferably of corrugated paperboard and a higher density exterior cap preferably of fiberboard sheets. The core of the structural member is formed by cutting a section of a selected thickness from a billet that comprises corrugated paperboard sheets stacked together parallel to a first plane and bonded together with adhesive. The section is cut on a line defined by a second plane perpendicular to the first plane. A pair of caps attach to the two faces which are exposed by cutting the billet.

In another aspect, the present invention provides a pallet comprising baseboards, stringers, and deck boards. At least two spaced-apart runners are attached transverse to at least two spaced-apart baseboards. The end portions of each stringer overlap and connect to the baseboards. At least two spaced-apart deck boards are attached transverse to the stringers. An end portion of the stringers overlap and connect to the baseboards. The baseboards, stringers, and deck boards are bonded together with adhesive at the overlapping portions. Each baseboard, stringer, and deck board comprises a core of corrugated paperboard sheets stacked and bonded together with an adhesive. The core is closed by caps which preferably are a fibreboard sheet.

In another aspect, the present invention provides a method of manufacturing a structural member. Adhesive is applied to a surface of a corrugated paperboard sheet having corrugations defined by a fluted sheet disposed between planar paperboard sheets. The paperboard sheets are stacked and bonded together to form a billet. The billet is ripped at a predetermined width to make an elongated core plank. The billet can also be cross-cut at a predetermined width to make an elongated core column. Caps are laminated on the lateral sides of the core plank (or core column) to cover the sawed faces. The capped cores form a capped plank or a capped column for use as a structural member.

Accordingly, it is an object of the present invention to increase the compression strength of wood-substitute structural members.

It is another object of the present invention to increase the bending strength or stiffness of a wood-substitute structural member.

It is another object of the present invention to provide a structural member that is easily workable on standard wood-cutting equipment typically in use in the container manufacturing industry.

It is another object of the present invention to decrease the use of materials in containers which are not readily recyclable.

It is another object of the present invention to increase the usefulness of structural members in forming mortises and tenons to make locking joints for frame construction.

It is another object of the present invention to reduce the cost of structural materials in comparison to wood structural materials.

It is another object of the present invention to reduce the weight of the structural member compared to wood.

These and other objects, advantages, and features of the present invention will become apparent from a reading from the following detailed description of the invention and the claims in view of the appended drawings.

BRIEF DESCRIPTION OF THE DRAWINGS

FIG. 6b is a bottom and end perspective view of the structural member and mortise illustrated in FIG. 6a.

FIG. 7b is a perspective view of the folded framing member shown in FIG. 7a.

FIG. 7c is a side detailed view of the notches cut in the framing member illustrated in FIG. 7a.

FIG. 8c is a side view illustrating the detail of the notch cut in the framing member of FIG. 8a.

DETAILED DESCRIPTION OF THE PREFERRED EMBODIMENTS

Figure 1:
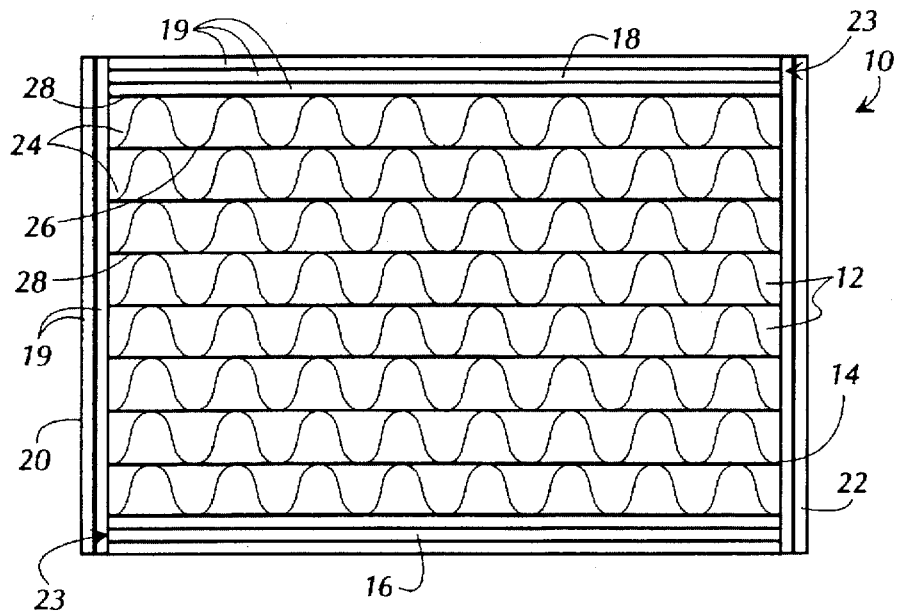
FIG. 1 is a cross-sectional view of an elongate structural member according to the present invention.

Referring now in more detail to the drawings, in which like numerals indicate like parts throughout the several views, FIG. 1 illustrates an end cross-section view of a preferred embodiment of an elongate structural member 10 for use as a substitute of wood members, particularly in corrugated paperboard shipping containers. The structural member 10 is a solid fibre-corrugated paperboard composite that is bonded together with an adhesive. The structural member 10 comprises a plurality of corrugated paperboard sheets 12 laminated together with an adhesive bond 14 between adjacent paperboard sheets. A bottom cap 16 and a top cap 18 sandwich the plurality of paperboard sheets 12. The bottom cap 16 and the top cap 18 are also referred to as the core fibre layers 16 and 18. The core fibre layers 16 and 18 bond with an adhesive to one of the respective outer paperboard sheets 12 with an adhesive. The core fibre layers 16 and 18 comprise one or more plies 19 of a fibreboard sheet. The adhesive bonds the plurality of fibreboard sheets together. A pair of side caps 20 and 22 referred to herein as caps 20 and 22 attach with adhesive to the sides of the structural member 10 to cover the corrugated paperboard sheets 12 and the edges 23 of the core fibre layers 16 and 18. The caps 20 and 22 comprise one or more plies 19 of fibreboard sheets. The plies adhere together with an adhesive. In the illustrated embodiment, the caps 20 and 22 have two plies of one-eighth inch thick fibreboard, the core fibre layers 16 and 18 have three plies of the fibreboard, and there are four plies of double-wall corrugated paperboard sheets.

The corrugated paperboard sheets 12 preferably are light-weight and generally contribute little to the top load compression strength of the structural member 10. The core fibre layers 16 and 18, the caps 20 and 22, and the thickness and width of the structural member 10 provide the compression strength, bending resistance and stiffness for the member. The corrugated paperboard sheets generally provide a form on which the solid fibre core layers and caps are built or attached to give the required overall cross-sectional width and the wall thickness necessary to achieve a desired compression strength, bending resistance, and stiffness. The corrugated paperboard sheets 12 further provide a central structure for forming joints with the structural member 10, as discussed below.

In the embodiment illustrated in FIG. 1, the corrugated paperboard sheets 12 are double-wall corrugated paperboard sheets. As known to those of ordinary skill in the art, double-wall corrugated paperboard comprises two layers of fluted medium 24 separated by an inner liner 26 of paper. The sides of the double-wall corrugated sheet 12 are closed by a pair of outer liners 28. The outer liners 28 are preferably sheets of kraft paper.

The thickness of each layer of corrugated paperboard 12 is primarily a function of the flute size. Three basic flute sizes are standard in the industry, in which A identifies the highest flute, C is next, with B the smallest flute. The industry standard double-wall corrugated paperboard uses a B-C flute configuration, but A-A flute, A-C flute and C-C flute are also typically manufactured. In general, the flute size is of little consequence structurally, but is of practical consideration in that the thicker the flute, the fewer number of corrugated plies are necessary to achieve a specified overall thickness of the structural member 10. A structural member 10 manufactured with A-A flute would require the fewest number of plies, A-C the next fewest, C-C, and B-C with the least. Fewer plies require fewer glue bonds which reduces both the materials cost and the labor cost in laminating the web plies of paperboard 12 together, as discussed below. These cost savings are balanced by the ready availability of B-C flute which is typically produced in much larger volumes and therefore is generally less expensive per thousand square feet than other flute configurations.

In an alternate embodiment (not illustrated), the structural member 10 is manufactured with triple-wall corrugated paperboard. This reduces the number of plies and glue bonds necessary to manufacture the structural member 10. However, triple-wall board is not manufactured by many companies, and material costs may be higher.

In another alternate embodiment, the corrugated paperboard sheets 12 are single-wall. However, this increases the number of plies and glue bonds of paperboard sheets necessary to manufacture the structural member 10.

Another alternate embodiment uses open-face corrugated board that does not have an outer liner. Although open-face corrugated paperboard is available in rolls, and is relatively inexpensive in general, bonding between adjacent plies is more difficult and production of the structural member 10 is slower due to difficulties in applying the adhesive.

Figure 2:
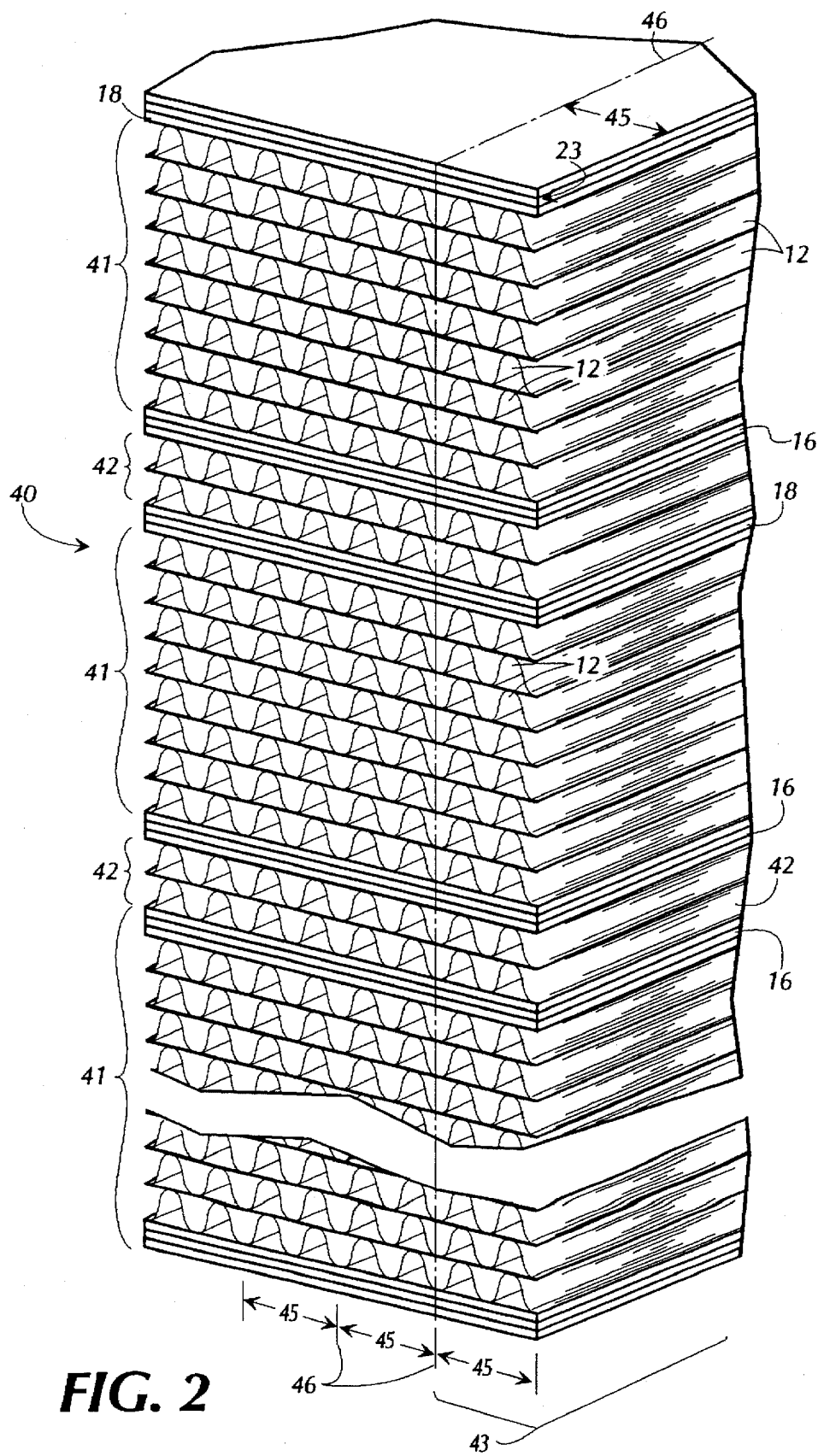
FIG. 2 is a perspective view of a billet from which a plurality of the structural member illustrated in FIG. 1 are formed.

The structural member 10 illustrated in FIG. 1 is preferably manufactured by forming and cutting an elongate billet 40 illustrated in perspective end and side view in FIG. 2. The billet 40 comprises a plurality of separated cores 41. The cores 41 each comprise the core fibre layers 16 and 18 together with the plurality of corrugated paperboard sheets 12 that define the thickness of the structural member 10. As a group the core fibre layers 16 and 18 and paperboard sheets 12 are referred to herein as the core 41. The core 41 can be manufactured in selected widths and thicknesses, by changing the number of plies used, depending on the requirements for the container. The billet 40 comprises a plurality of the cores 41, each separated by a rip-out layer 42. The rip-out layer 42 preferably is double-wall corrugated paperboard, for a purpose discussed below. An alternate embodiment of the billet (discussed below) is built with corrugated paperboard sheets to the desired width of a plank and does not include the rip-out layer 42.

A plurality of cores 41 are assembled in the billet 40 to a selected thickness of the billet 40. A plurality of core planks 43 are then cut from the billet 40 by ripping to a predetermined width 45 as indicated by the spaced-apart lines 46. In a preferred embodiment, the width for cutting the core planks 43 are 1 and ½ inches to about 2 inches. The width can be changed as needed to make a plank of a selected thickness. The core planks 43 cut from the billet 40 are preferably intermediate products, but as discussed below, can be used for framing members.

The caps 20 and 22 illustrated in FIG. 1 are subsequently attached to the core plank 43 to cover the plies 12 of paperboard sheets and the edges 23 of the caps 20 and 22, as discussed below. The resulting plank 44 is referred to herein as a capped plank or plank. The plank 44 is then ripped through the rip-out sheets 42 to separate individual structural members 10 from the plank.

Figure 3:
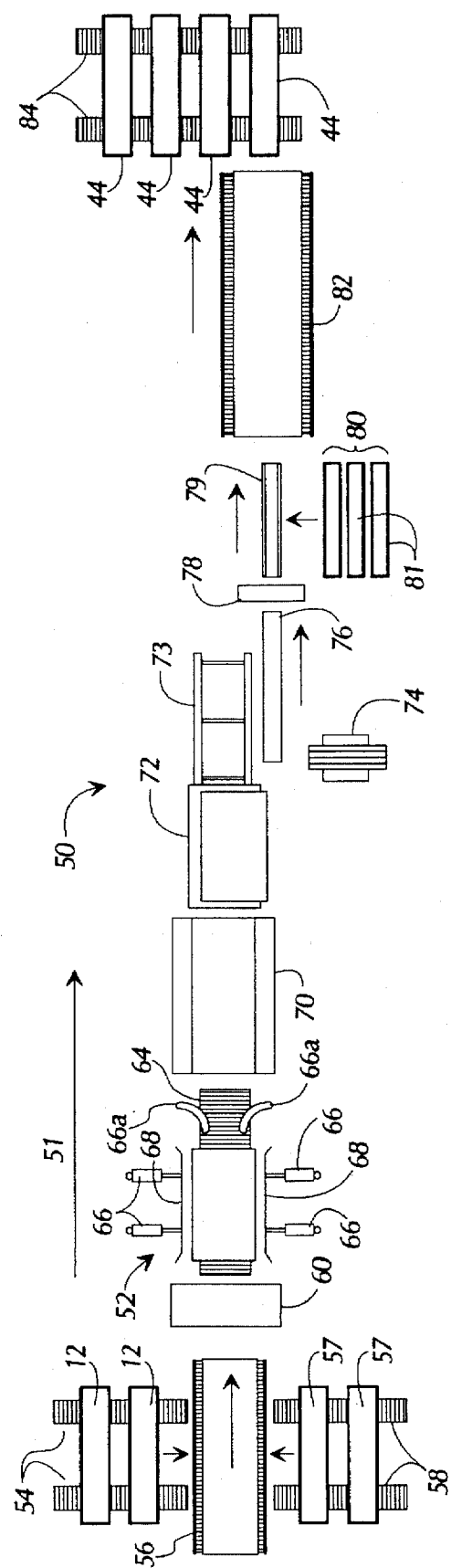
FIG. 3 is a top plan view of a manufacturing line for making the structural member illustrated in FIG. 1.

FIG. 3 is a top plan view of a manufacturing line 50 having a direction of flow 51 for assembling the billet 40 and cutting the plurality of structural members 10 from the billet 40. The manufacturing line 50 has a billet forming station 52. A pair of conveyors 54 carry a plurality of corrugated paperboard sheets 12 to a feed conveyor 56. A pair of conveyors 58 carry a plurality of fibreboard sheets 57 for the core fibre layers 16 and 18 to the feed conveyor 56. The conveyors 54 and 58 preferably hold stacks of the paperboard and the fibreboard for placement on the feed conveyor 56 selectively.

The paperboard sheets and fibreboard sheets are selectively removed in sequence to build the billet 40, as discussed below. The feed conveyor 56 moves the corrugated paperboard sheets and the fibreboard sheets into and through a glue spreader 60. The glue spreader 60 applies an even layer of adhesive to a surface of the corrugated paperboard sheet or the fibreboard sheet passing through.

The billet forming station 52 receives the glued sheets from the glue spreader 60 on a roller conveyor 64. The billet 40 is built on the roller conveyor 64 using the glued sheets selected in sequence from the conveyors 54 and 56. A plurality of squaring cylinders 66 connect to squaring plates 68 on the sides of the billet forming station 62. The squaring cylinders 66 preferably are hydraulically operated cylinders. The cylinders 66 push the squaring plates 68 against the side of the billet 40 as it is assembled by layering the paperboard and fibreboard sheets. The squaring cylinders 66 and the plates 68 align the billet 40 at it is assembled.

The roller conveyor 64 transfers the assembled billet 40 to a compression station 70 which includes a plurality of rollers for forcibly laminating the paperboard sheets and fibreboard sheets together. Such compression apparatus are known to those of ordinary skill in the art. The length of the compression station 70 depends on the curing time of the adhesive and the speed of the conveyor belt carrying the billet 40 through the compression station 70. An air-operated press conventional in the plywood industry can be use instead of a roller compressor. A conveyor transfers the laid-up billet into a press. A top platen of the press is forced down to compress the billet. The pressure is maintained for a specified curing or set time for the adhesive.

A carriage 72 receives the compressed billet 40. The carriage 72 travels laterally on rails 73 past a band head rig 74 for ripping the billet 40 into the core planks 43, as illustrated by the lines 46 in FIG. 2. In a preferred embodiment, the band head rig 74 has a double-sided band saw which enables the billet 40 to be cut in both a forward and a reverse pass of the carriage 72.

A plank conveyor 76 receives the core planks 43 cut from the billet 40. The plank conveyor 74 transfers the core plank from the head rig 70 to a glue spreader 78. The glue spreader 78 applies adhesive to the lateral sides of the core plank 43. The glued core plank 43 is placed on a conveyor 79 for receiving the caps 20 and 22. An adjacent stacking area 80 includes a supply of fibreboard caps 20 and 22 for the sides of the structural member 10. A compressor 82 receives the core planks 43 from the conveyor 79 to laminate the caps 20 and 22 to the core planks. A take-away conveyor 84 receives the compressed capped planks 44. Each plank 44 is subsequently ripped longitudinally along the rip-out sheets 42 releasing the structural members 10 having the desired width and thickness for a replacement for a wood member. The structural member 10 is cut to length and processed on conventional wood cutting equipment, such as saws and other devices to form tenons, mortises, and beveled ends, as discussed below.

The billet 40 is manufactured on the assembly line illustrated in FIG. 3. One sheet of fibreboard 57 for the core fibre layer 16 is removed from the conveyors 58 and placed on the feed conveyor 56. The sheet rolls on the feed conveyor 56 into the glue spreader 60 which applies a metered coat of adhesive to the upper surface of the fibreboard. The sheet is positioned on the roller conveyor 64 between the squaring plates 68. Additional sheets of fibreboard are similarly coated with adhesive in the glue spreader and placed in a stack on the roller conveyor 64. In a preferred embodiment, three sheets of fibreboard are used for the core fibre layers 16 and 18, respectively.

After the fibreboard layer 16 is positioned on the roller conveyor 64, the corrugated paperboard center is built. One of the double-wall corrugated sheets 12 is removed from the conveyor 54 and placed on the feed conveyor 56. The corrugated paperboard sheet is passed through the glue spreader 60 for applying a film of adhesive to the sheet. The corrugated paperboard sheets are stacked on the billet 40 in sequence. In the illustrated embodiment, four plies of double-wall corrugated paperboard sheets 12 are used.

The layer 18 of fibreboard sheets is then placed on the billet 40 in the manner discussed above for the layer 16. The layer 18 has sufficient plies of fibreboard sheets to yield the desired wall thickness of the structural member 10 to be made from the billet. In an alternate embodiment, the core fibre layers 16 and 18 are corrugated paperboard. The core fibre layers in this embodiment are thicker and have lower tensile strength than the fibreboard. Generally corrugated paperboard is more readily available and less expensive per square foot than is fibreboard.

A double-wall sheet of corrugated paperboard is then passed through the glue spreader 60. This sheet is placed on the billet 40 for the rip-out sheet 42 as best illustrated in FIG. 2. A second core 41 is then assembled in sequence as discussed above on top of the previous core.

This process of gluing and placing the plies of fibreboard and corrugated paperboard for the cores 41 continues until the billet 40 is assembled to the desired thickness and having two or more cores 41. (As discussed below, the billet may have only one core because no rip-out layers are included, for example, see FIG. 16.) In a preferred embodiment, the billet 40 is about 12 inches thick. The resulting core planks 43 have a width of about 12 inches, a thickness equal to the cutting width 45, and a length equal to the length of the billet 40. During assembly, the squaring cylinders 66 are operated to drive the squaring plates 68 against the sides of the billet 40. The squaring plates 68 force the plies into alignment to square the billet 40. In the illustrated embodiment, a pair of squaring cylinders 66a are disposed forward of the billet 40 for squaring the front side, in the event the glue spreader 60 pushes the sheets too far forward. Although not illustrated, it may be necessary to include a second set of squaring cylinders 66a behind the billet 40 for squaring the back side. The last fibreboard ply for the layer 18 on the uppermost core 41 does not receive adhesive in the glue spreader 60.

The billet 40 typically is approximately 43 inches wide by 12 inches thick by 120 inches long. In practice, the lengths of such billets are set to yield the proper length for the finished parts to be produced. Thus the billet can be formed to standardized lengths for general use to maximize production efficiency. The resulting planks of structural material can be re-sawn to form parts or other structural uses in the same manner as lumber planks are used. The replacement material of the present invention provides uniformity in comparison to lumber material. Lumber typically contains knots, has splits, may warp and rot. The waste factor of the replacement material is significantly lower than that for lumber. Further, the waste is fully recyclable, as opposed to lumber waste which typically is disposed of in landfills.

The assembled billet 40 is fed by the roller conveyor 64 into the compression station 70 which applies compressive force to the billet 40 as it passes through the compression station. The speed of the transfer is correlated with the curing time of the particular adhesive so that the billet 40 emerges at the end of the compression station 70 with the plies of paperboard and fibreboard fully bonded. The adhesive can be starch, PVA cold setting glue, dextrin, or other similar adhesive. In the alternative, an air-operated press compresses the billet, as discussed above.

The billet 40 is received from the compression station 70 on the carriage 72 which is capable of forward and reverse travel. The billet 40 is carried by the carriage past the head rig band saw 74 which rips the billet at predetermined widths 45 to form the core planks 43 having a predetermined thickness. Such carriage and band saw cutting apparatus is conventional for wood board cutting. The apparatus is set to cut the predetermined width 45 and then index laterally after each pass through the billet 40. The style of the blade tooth of the band saw is preferably different then that for wood to insure smooth cuts through the billet, which has a different density and fibre orientation than wood.

The width of the planks cut on each pass of the billet through the head rig is preset and determined by the desired finish thickness of the structural member 10. The width of the cut defined by the indexing of the carriage takes into consideration the combined thickness of the caps 20 and 22 which are subsequently laminated to the plank 44. The cut by the head rigs 74 through the billet 40 therefore yields a core plank 43 of less thickness than the finished capped plank 44.

The core planks 43 are then rotated and passed through the double-sided glue spreader 78 which applies a film of adhesive to the exposed sides of the sheets 12 and the edges 23 of the core fibre layers 16 and 18. One of the solid fibreboard sheets is removed from the stack 81 and is placed on the conveyor 79 for receiving one of the core planks 43 from the glue spreader 78. This sheet is the cap 20. Another of the fibreboard sheets is similarly placed on "top" of the core plank 43 which is then passed through the compressor 82 to laminate the caps 20 and 22 to the plank. The capped planks 44 emerge from the compressor 82 as a finished board ready for shipment to manufacturing areas for ripping to separate the structural member 10 from the plank 44. The structural member 10 undergoes further operations such as cutting to length, tenoning, and mortising, as required for particular cleats or frame members. This is discussed below.

During the final ripping of the planks 44, the rip-out sheets 42 are utilized. The plank 44 is placed on a saw and cut longitudinally along each rip-out sheet 42 to separate the structural members 10. The plank 44 is pre-engineered for a net final width when the structural members 10 are formed by cutting along the rip-out layer 42 of double-wall corrugated paperboard. Although other widths can be cut from the plank 44, the resulting sequence of paperboard sheets 12 and fibreboard sheets 18 and 20 will vary. The strength of the plank 44 may thereby be lessened. This may be of little consequence if the separated portions of the plank are used flat, such as a base or top frame cross piece. For use as a column, the planks 44 preferably are cut on the rip-out sheets 42 to the pre-engineered widths to ensure that the column has the designed compression strength.

The manufacturing discussed above of the replacement structural member 10 is a continuous flow process with minimal waste and labor. The billet bonding adhesive can be starch, as used in corrugated paperboard, PVA cold setting glue, dextrin, or other suitable adhesives.

In an alternate embodiment (not illustrated) the head rig 70 is a multi-band, thin kerf bandsaw. In this embodiment, a plurality of core planks 43 are cut simultaneously from the billet 40.

Figure 4:
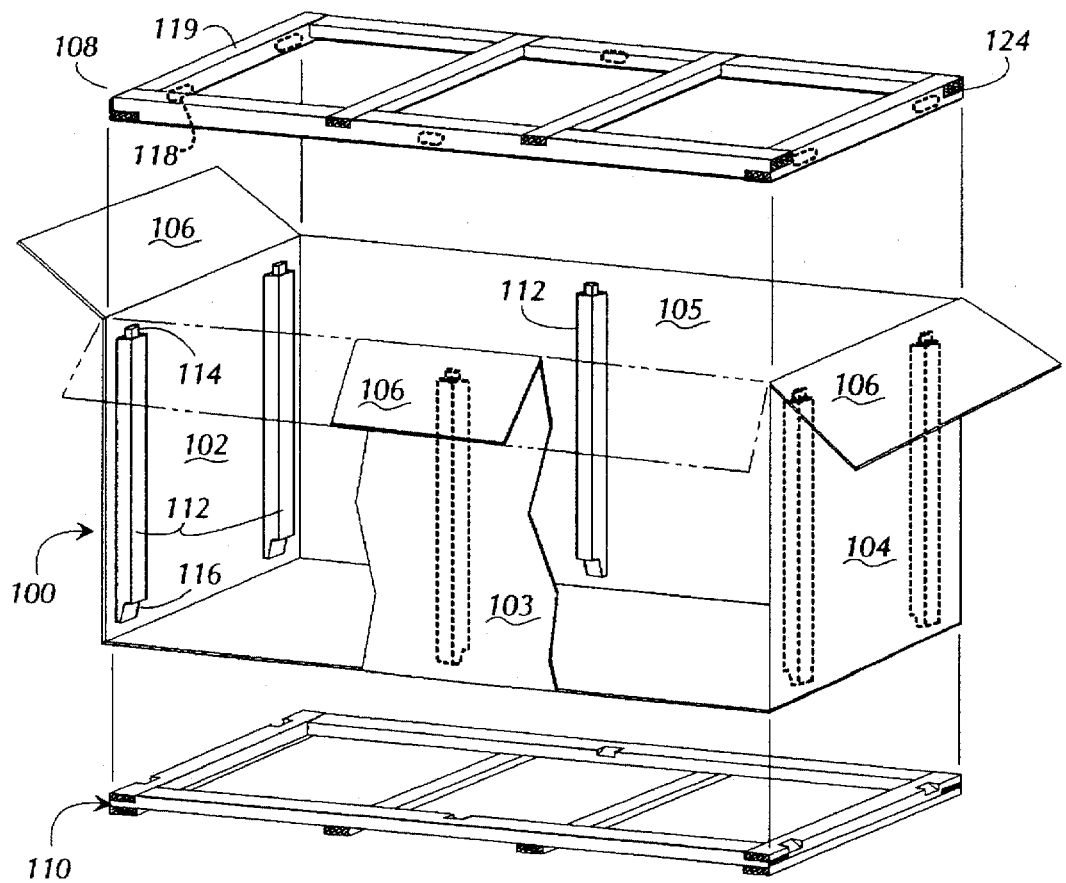
FIG. 4 is a perspective view of a corrugated paperboard container having cleats and frame members made from the structural member shown in FIG. 1.

FIG. 4 is a perspective cut-away view of a corrugated paperboard container 100 having cleats and frame members, as discussed below, made from the structural member 10. The body of the container 100 preferably forms from a blank of corrugated paperboard material. The blank includes four main panels 102, 103, 104 and 105 foldably connected along three score lines, as is known in the art. The four main panels 102–105 form the four walls of the container 100. A manufacturer's joint, common in the industry, foldably connects to one of the main panels along a score. The manufacturer's joint allows the ends of the blank to be joined together with glue and staples to form the completed container 100. In the illustrated embodiment, a series of four top flaps 106 foldably connect to the main panels 102–105 along score lines for closing the top of the container 100. A top frame 108 inserts into the upper end of the container 100. A base 110 provides a bottom support for the container and the goods packaged therein.

The panels 102–105 are provided with vertical reinforcement cleats 112 (shown in phantom on panels 103 and 104), which are cut to length from the structural member 10. As illustrated in FIG. 1, the structural member 10 has square-cut exterior sides and edges for facilitating attachment of the cleats 112 to the panels 102–105. The corner and centrally disposed cleats 112 attach to the corrugated outer body 100 in a conventional manner. These conventional methods of attachment include gluing, stapling, or a combination, such as used for attaching wood cleats. Machinery for attaching cleats to corrugated paperboard bodies is conventional in the container industry. The corrugated body serves to enclose, contain, and brace the cleats to provide both torquing and racking strength for handling and stacked shipment. The corrugated container provides a dust and damage protection barrier for the product in the container. Such containers are typically printed with advertising, part numbers, and product information.

Figure 5:
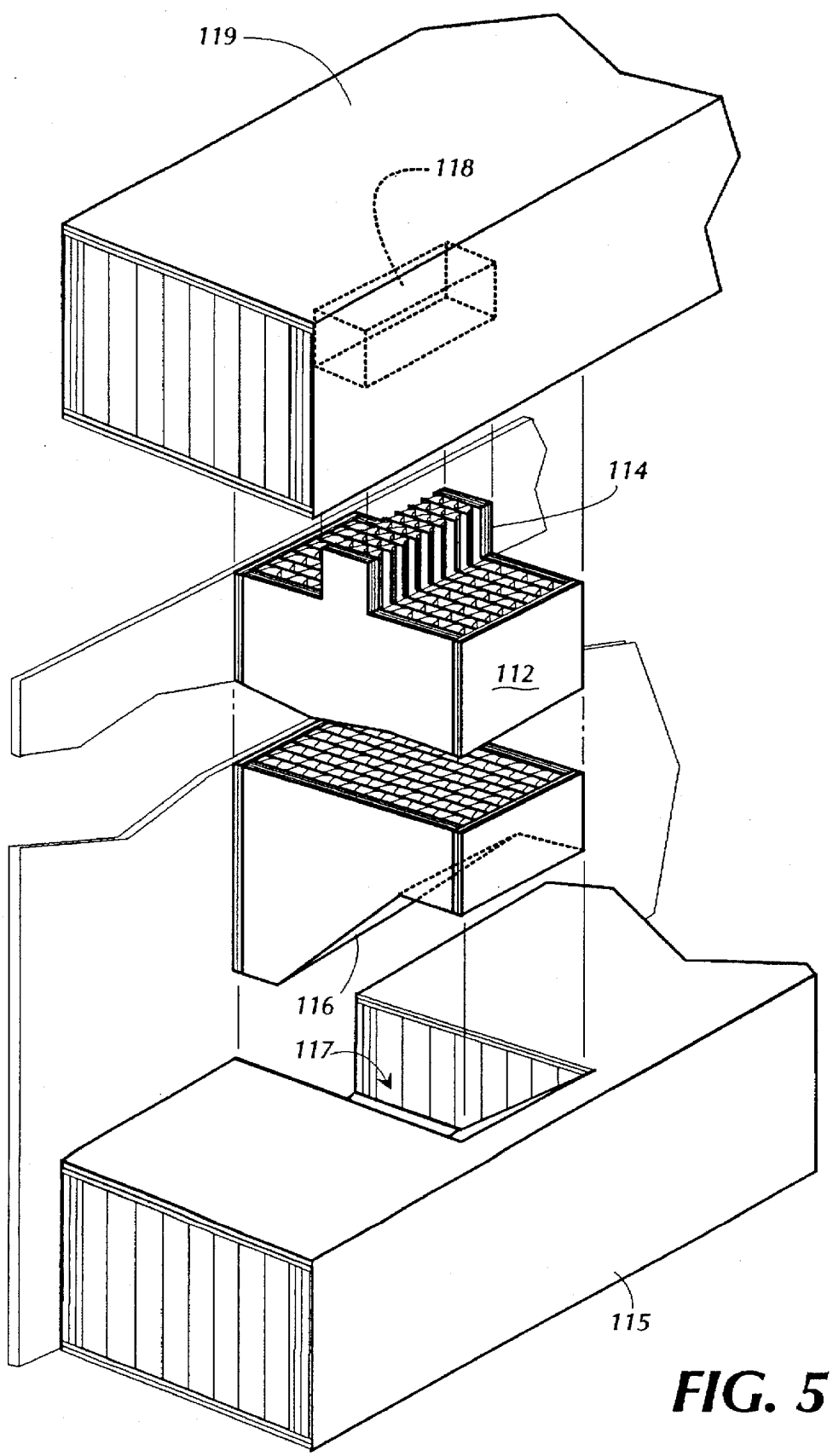
FIG. 5 is a detailed exploded perspective view of a cleat made from the structural member illustrated in FIG. 1, having an end tenon that inserts into a mortise of a cross member and a bevel end that mates to a bevel cut in a second cross member, for use in a shipping container.

As best illustrated in FIG. 5, the cleats 112 are cut at an upper end to form a tenon 114 and at a bottom end to form a bevel 116. The tenon 114 locks into a corresponding mortise 118 in a member 119 of the top frame 108. The tenon and mortise joint prevents the top frame 108 from being dislodged from the vertical cleats. The thickness of the tenon is preferably about one-third the thickness of the column 110. The tenon cap is preferably between about one-third and one-half the thickness of the cleat 112. The tenon width preferably is the full width of the cleat 112. The bevel 116 is matingly received by a cutout 117 in a cross-member 115 made of the structural member 10. A bevel similar to the bevel 116 is further discussed below with respect to FIG. 6c.

Figure 6A:
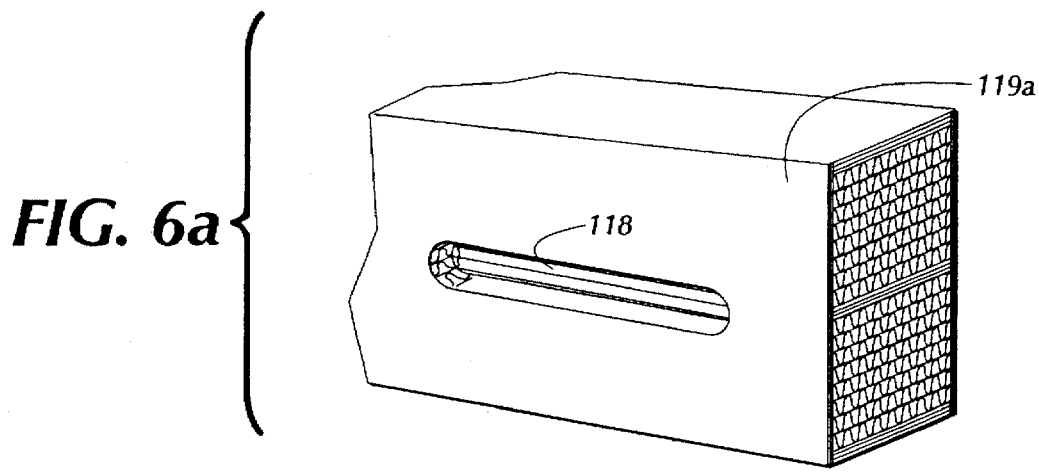
FIG. 6a is a side perspective view of a mortise in a structural member illustrated in FIG. 1.
Figure 6B:
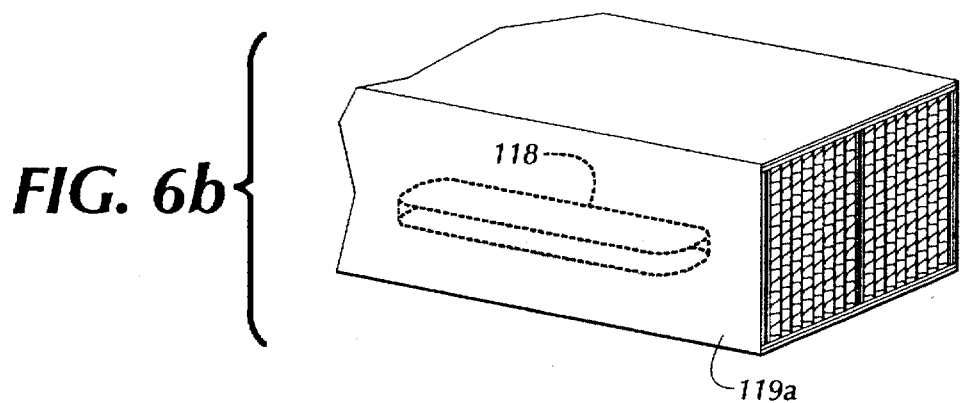

With reference again to FIG. 4, top frame 108 assembles from a plurality of members cut from the structural member 10. The ends 124 are cut for lap joints to rigidly connect the members together. The lap joints are preferably glued together with an adhesive. The frame members, for example 119a, include a mortise 118 for receiving the tenon 114 of the cleat 112. FIGS. 6a and 6b are detailed bottom and side views of the mortise 118 cut in the member 119a. The mortise 118 preferably is cut with a standard wood working slot mortiser to receive the rectangular-shaped tenon 114 of the cleat 112. The mortise 118 preferably has a width about 3/16 of an inch wider than the thickness of the tenon 114. This facilitates an easy fit during assembly of the container 100 on a pack line. The depth of the mortise 128 is substantially the same as the depth of the tenon 114. In a preferred embodiment the length of the mortise is approximately 1/4 to 1/2 inch longer than the width of the cleat 112.

Figure 6C:
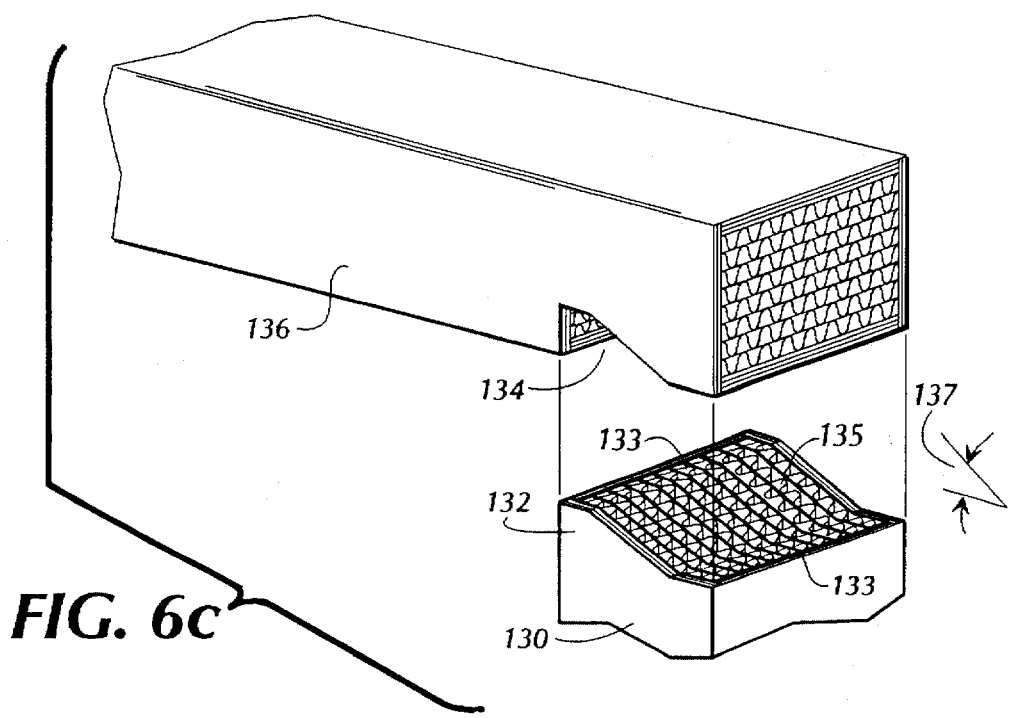
FIG. 6c illustrates a cleat made from the structural member illustrated in FIG. 1, having a bevelled upper end that engages a bevel notch in a cross member, for use in a shipping container.

FIG. 6c is a perspective exploded view of a cleat 130 having a beveled tenon 132 at a first end with a pair of plateau surfaces 133 adjacent the sloping surface 135. A mating groove 134 is cut in a transverse frame member 136 for receiving the beveled tenon end 132. The groove 134 is cut with a conventional wood working tenoner with a profile blade in the shape of the groove. In a preferred embodiment, the angle 137 of the bevel is about 24°. The height of the bevel is approximately 1/2 the width of the thickness of the cleat 130. The plateau surfaces 133 are approximately 1/4 the thickness of the cleat 130. In a preferred embodiment, the cleat 130 attaches to a side wall of a corrugated container having top flaps, such as that illustrated in FIG. 4. The top flaps close down tightly over a frame made of the cross member 136. This forces the mortise-tenon joint to remain tight. The plateau surfaces 133 transfer the top load on the cross member 136 to the vertical cleat 130.

In one embodiment of the present invention, a cleat was manufactured with three plies of solid fibreboard for the core fibre layers 16 and 18 sandwiching four double-wall corrugated plies 12. Two plies of solid fibre sheet were used as the caps 20 and 22. The solid fibre sheets were 90 point fibre. A 30 inch cleat having a width of two inches and a thickness of one and one half inches supported a 1500 pound compression load. The tenon 114 was one half inch thick and had a depth of between one and one and a half inch. This particular cleat was sized for attaching to the inner surface of a corrugated paperboard container 100 while still allowing the container to collapse flat for shipment to the user. Such flat shipping is known in the industry as knock-down. The containers are typically shipped to an end user in a knock-down position to save space and freight costs.

Figure 7A:
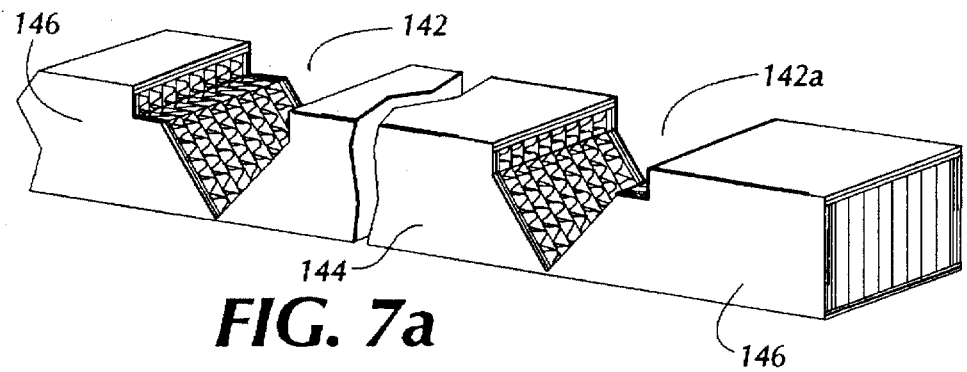
FIG. 7a is perspective view of a foldable framing member manufactured from the structural member illustrated in FIG. 1.
Figure 7B:
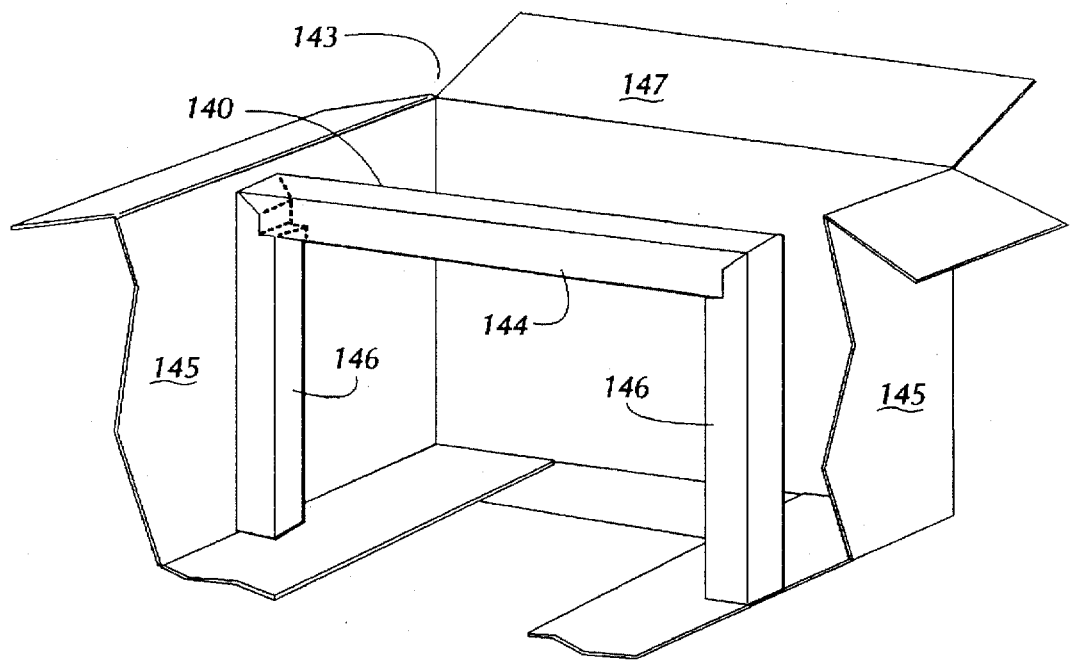
Figure 7C:
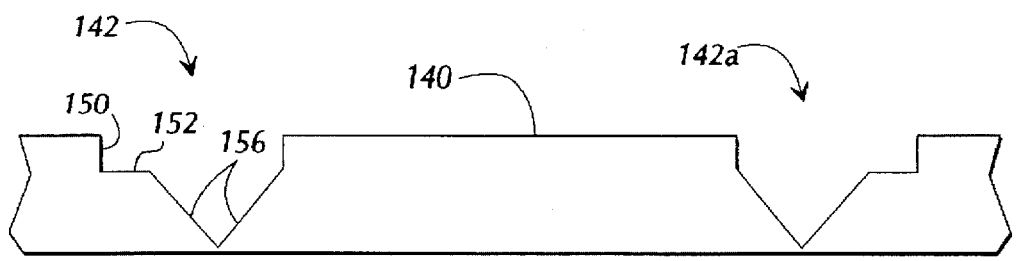

The structural member 10 of the present invention can be formed into an integral U-shaped structural brace 140 illustrated in FIGS. 7a, 7b, and 7c. The brace 140 facilitates use of a reinforced post or column in shipping containers which are not supplied with a cleat already secured to the side wall. With reference to FIG. 7a, the structural member 10 is cut with two spaced-apart notches 142 to define a top brace 144 and two vertical columns 146 as a continuous unit. The end user folds the structural member 10 at the notches 142 to form the U-shaped brace 140 as illustrated in FIG. 7b. The U-brace 140 is placed in a container 143 (partially illustrated). The columns 146 are stapled or glued conventionally to the side walls 145 of the container 143. One or more of the U-braces 140 can be centrally disposed in a longitudinal container for vertical and top load support between the ends of the container. A cap, or flaps 147, contact the top brace 144 to close the container.

FIG. 7c illustrates a side view of the brace 140. The notch 142 preferably has a length of 1.5 times the thickness of the structural member 10. The notch 142 includes a seat 148 with a bottom 150 and a side 152. The depth and width of the seat 150 is preferably 1/2 the thickness of the structural member 10. Adjacent the seat is a beveled surface 156. The angle of the bevel is preferably 45° for folding the columns 146 and the top brace 144 to a square 90° corner. A mirror image of the notch 142 forms the second notch 142a in the structural member 10 for forming the U-shaped brace 140. The square-off bottom 150 and side 152 provides a flat surface for transferring the top load to the vertical columns 146 and preventing the side columns from being forced outwardly.

Figure 8A:
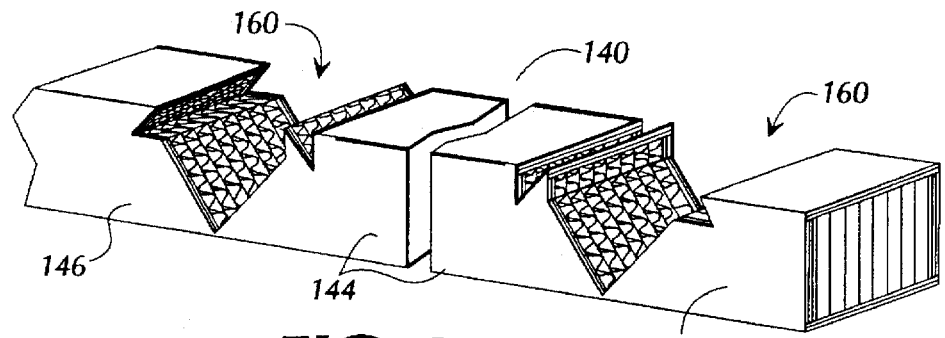
FIG. 8a is a an alternate embodiment of the foldable framing member illustrated in FIG. 7a having a locking corner notch.
Figure 8B:
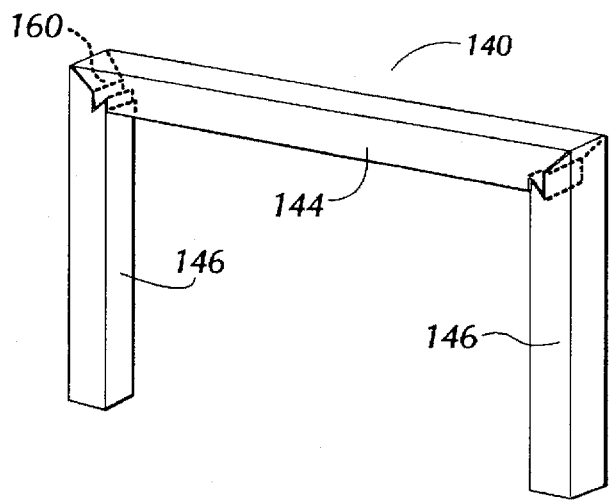
FIG. 8b is a perspective view of the framing member illustrated in FIG. 8a, folded to form a frame member for a container.
Figure 8C:
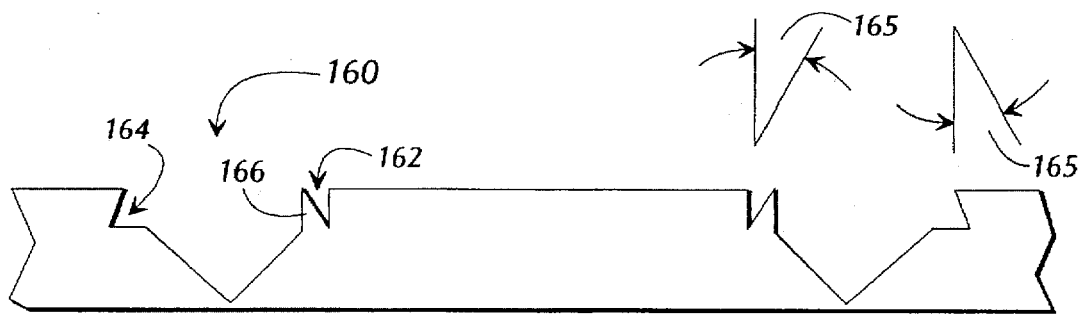

FIGS. 8a, 8b, and 8c illustrate a U-brace 140 with an alternate embodiment 160 of the notch 142. The notch 160 locks the top brace 144 to the corner columns 146 with resistance to both internal and external lateral pressure. The notch 160 must be cut on a multi-head tenoner because of a pair of backcuts 162 and 164 illustrated in FIG. 8c. *The angle 165 of the backcuts are preferably* 20°. The backcut 162 forms a tooth 166 that inserts into the backcut 164 to lock the columns 146 to the top brace 144. The backcuts 162 and 164 cooperate to transfer the load on the top brace 144 to the vertical columns 146.

In both notches 142 and 160 of FIGS. 7 and 8, the outermost plies of the solid fibre layer 16 are not cut but remain as a hinge to join the columns to the top brace. The U-brace 140 illustrated in FIGS. 7 and 8 are collapsible, clean, free of moisture, sawdust, insects and corrosive acids. The U-brace 140 of the present invention is shipped flat and banded in bundles. Bundled together, the U-braces 140 occupy a relatively small amount of warehouse space. This saves freight costs and warehouse costs. The braces 140 are fully recyclable in the same manner and at the same location as corrugated paperboard. The structural members 10 are preferably formed with a high percentage of recycled fibre, thus forming a closed loop in the recycling system.

Figure 9:
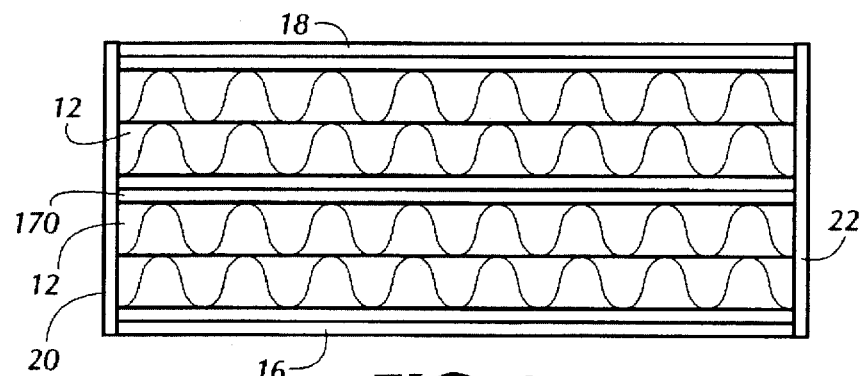
FIG. 9 is an end view of an alternate embodiment of the structural member illustrated in FIG. 1, having a web disposed between interior corrugated paperboard sheets.

FIG. 9 is an end view of an alternate embodiment of the structural member 10 illustrated in FIG. 1. In this embodiment, a web 170 formed of a pair of solid fibreboard sheets, is disposed centrally in the core between a pair of corrugated sheets 12. In this embodiment, the caps 20 and 22 are single plies of fibreboard sheets; the core fibre layers 16 and 18 are double plies.

Figure 10:
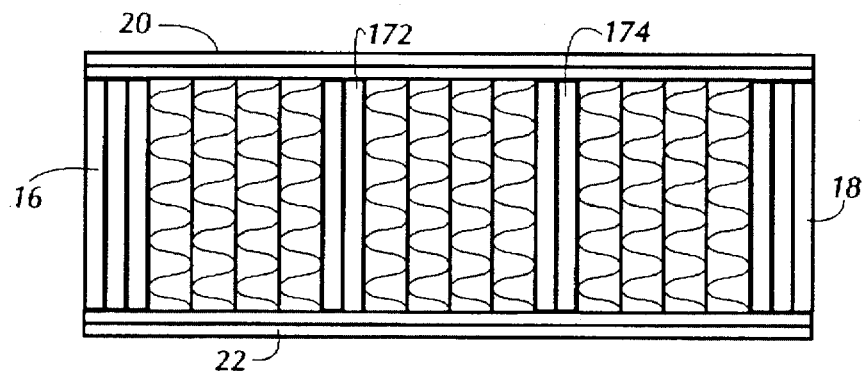
FIG. 10 is an end view of an alternate embodiment of the structural member illustrated in FIG. 1, having a pair of webs equally disposed between the sides of the structural member.

FIG. 10 is an end view of an alternate embodiment of the structural member 10 illustrated in FIG. 1. In this embodiment, a pair of webs 172 and 174 are equally disposed between the layers 16 and 18 of the structural member 10. In this embodiment, the structural member 10 has three sets of corrugated paperboard sheets and each set has two of the corrugated sheets 12. The core fibre layers 16 and 18 are three plies of fibreboard; the sides are two plies.

Figure 11:
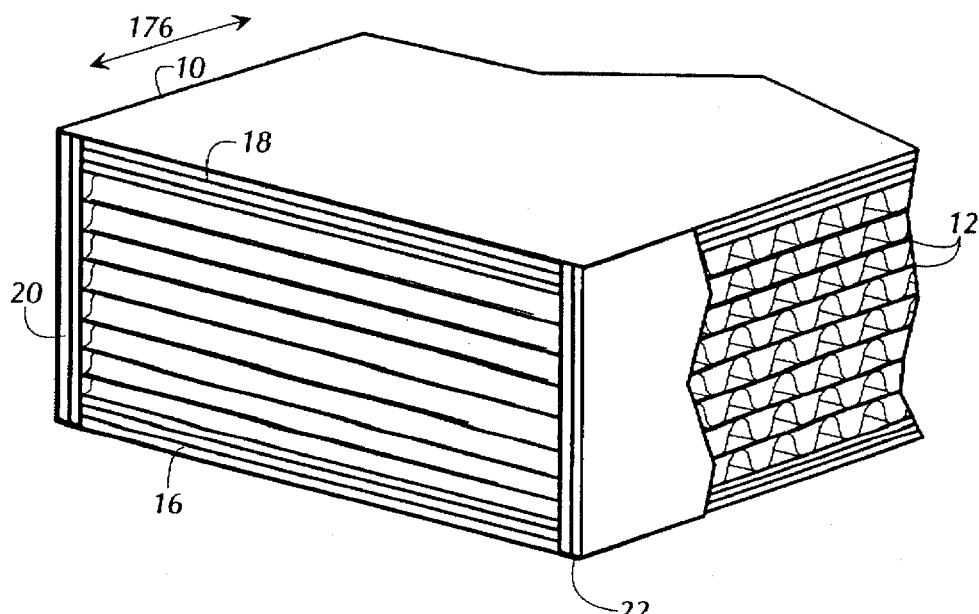
FIG. 11 is a perspective end and side view of an alternate embodiment of the structural member illustrated in FIG. 1, having corrugated sheets disposed with the flutes of the corrugations transverse to a longitudinal axis of the structural member.

FIG. 11 is a perspective end and side view of an alternate embodiment of the structural member 10 illustrated in FIG. 1. In this embodiment, the corrugated paperboard sheets 12 are disposed with the flutes of the corrugations transverse to a longitudinal axis 176 of the structural member 10.

The present invention accordingly provides a substitute structural member 10 having reduced weight with sufficient top load compression strength for use as a cleat in a corrugated paperboard container for heavy goods. The structural member 10 is readily manufactured and processed with wood-cutting equipment typically used in the industry for forming frame members and joints sufficiently rigid to withstand handling, stacking, and shipping.

Figure 12:
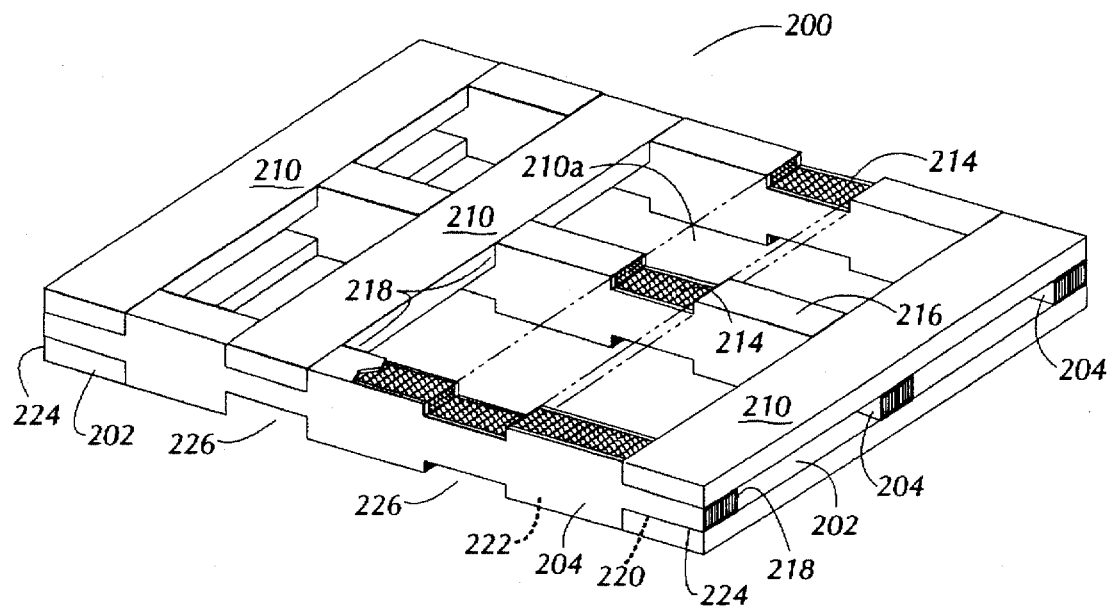
FIG. 12 is a perspective view of a pallet assembled from planks of the present invention.

As discussed above, the structural member of the present invention is used as a plank, a cleat, or a board. FIG. 12 is a perspective view of a pallet 200 assembled from planks of the present invention. The pallet 200 includes a pair of spaced-apart baseboards 202 which define a base for the pallet. At least two stringers 204 attach to the baseboards. In the illustrated embodiment, three spaced-apart stringers 204 are disposed perpendicular to the baseboards 202. The distal ends 206 of the stringers 204 connect to an upper surface 208 of the baseboards 202. At least two deckboards 210 attach to the stringers 204. In the illustrated embodiment, four deckboards 210 are disposed perpendicular to the stringers 204 and connect to an upper surface 212 of the stringers. (One of the deckboards 210a is illustrated in phantom to illustrate details of the stringers 204, as discussed below.) The deckboards 210 are parallel to and spaced from the baseboards 202. In alternate embodiments (not illustrated), there are additional baseboards, stringers, and deckboards, depending on the load to be carried on the pallet.

In the illustrated embodiment, the stringers 204 include a first notched portion 214 in an upper surface 216 for receiving the deckboards 210. There is a first notched portion 214 for each of the deckboards 210. The deckboards 210 overlap the first notched portions 214. Each of the overlaps of the deckboards 210 and the stringers 204 forms a joint generally designated 218. The overlaps in the joints 218 are rigidly secured together with an adhesive.

The stringers 204 also include a second notched portion 220 in a lower surface 222. There is a second notched portion 220 for each of the baseboards 202. The baseboards 202 overlap the stringers in the second notched portions 220. The overlaps form joints generally designated 224 between the baseboards 202 and the stringers. The joints 224 are rigidly secured together with an adhesive.

In the illustrated embodiment, the stringers 204 further include a pair of spaced-apart slots 226. The slots 226 are preferably spaced-apart from a central axis through the pallet 200. The slots 226 provide an entry for the forks of a forklift truck for picking and carrying the load on the pallet 200.

Figure 13:
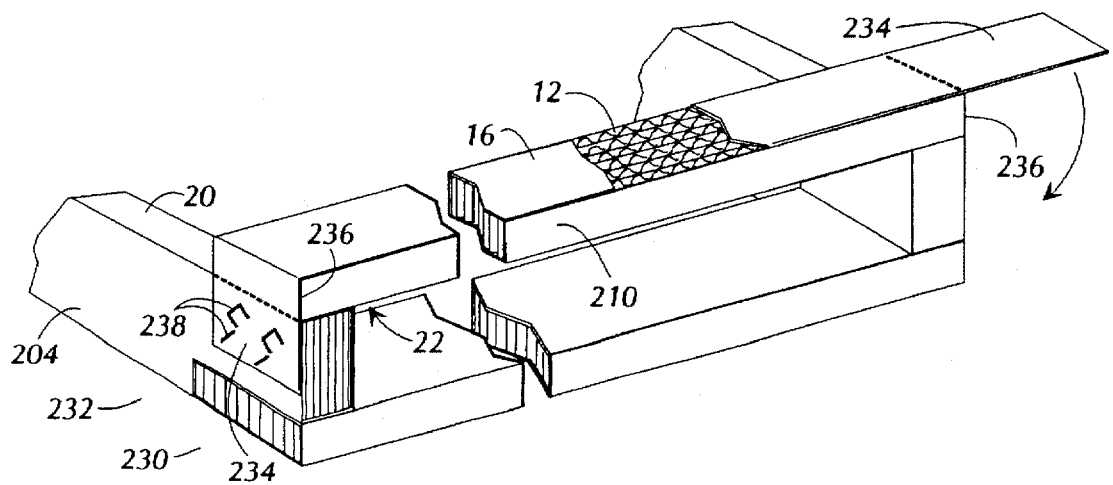
FIG. 13 is a perspective view of a corner of the pallet shown in FIG. 12 to illustrate details thereof.

FIG. 13 is a perspective view of a corner 230 of an alternate embodiment pallet 232 of the pallet 200 shown in FIG. 12. In this embodiment, the stringers 204 do not include the first notches 214 for receiving the deckboards 210. The deckboards 210 thereby sit above the upper surface 216 of the stringers 204. The core of the stringers 204 comprises the corrugated paperboard layers 12 as discussed above. This core is less dense than the core fibre layers 16 and 18 of solid fibre. Nails and staples placed through the deckboards 210 into the stringers 204 may become separated during handling of the pallet 232. Glue or adhesive is preferably applied to the contacting caps 20 and 22 of the deckboards 210 and the stringers 204 to provide most of the adherence strength of the structural members.

The surface area of contact however is relatively small. To reduce possible separation, this embodiment includes an overlap flap 234 which folds against the side face of the stringer 204. The flap 234 is an extension of one of the caps 20 or 22 beyond a respective end 236 of the deckboard 210. The flap 234 folds at the end 236 against the side face of the stringer 204. Glue or adhesive bonds the adjacent faces of the flap 234 and the stringer 204 together. Staples 238 may be driven through the flap 234 for holding the flap in place while the adhesive sets. Further, the flap 234 provides a larger area for receiving adhesive. The deckboard 210 is rigidly connected by the staples 238 to the core and by the adhesive to the cap. This feature of the flap 234 may be used with the pallet illustrated in FIG. 12. In an alternate embodiment, an L-shaped piece of solid fibreboard is adhered over the end and side faces of the deckboard 210 and the stringer 204 after the pallet is assembled.

Figure 14:
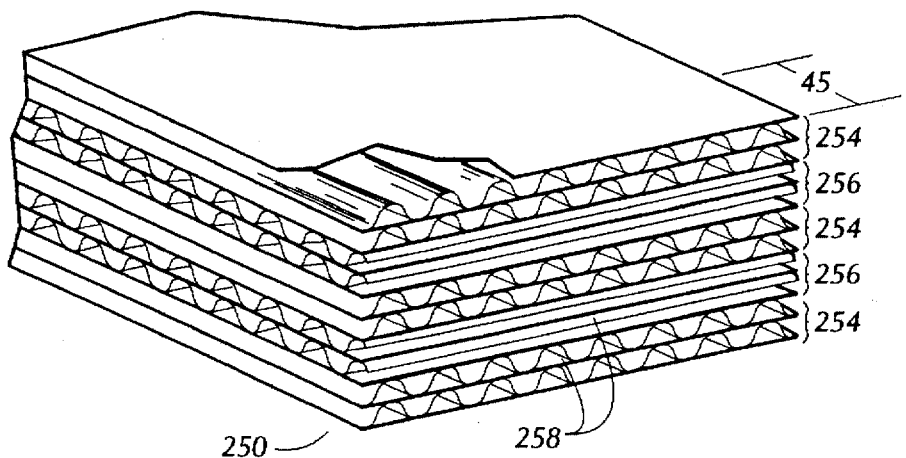
FIG. 14 is a perspective view of a cross-corrugated billet according to the present invention.
Figure 15:
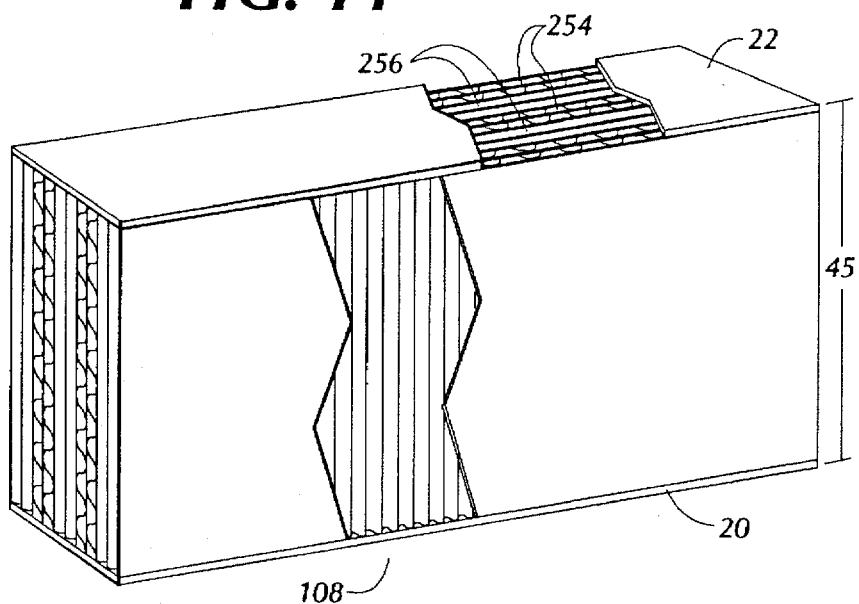
FIG. 15 is a perspective view of a beam cut from the billet illustrated in FIG. 14 and finished with caps.

FIG. 14 is a perspective view of a cross-corrugated billet 250 according to the present invention. Structural members 10 such as the planks 44 discussed above are preferably formed from billets 250 having a cross-corrugation core 252. The cross-corrugation core 252 comprises alternating layers 254 and 256 of corrugated paperboard sheets with the corrugations disposed at a perpendicular angle to the adjacent sheet. In the illustrated embodiment, double wall sheets of corrugated paperboard 258 are adhered together with the orientation of the corrugations alternating between layers. The billet 250 is cut to width as discussed above with respect to FIG. 3 to form the core planks. The core plank is then capped, as illustrated in FIG. 15 which is a perspective view of a beam cut from the billet 250. Such beam is preferably used to make a top frame, such as the top frame 108 shown in FIG. 4. The cross-corrugations provide compression strength in the vertical direction to support stacking loads. The cross-corrugated beams further resists deflection when the top frame 108 is top loaded, for example, by a smaller but heavy package placed on the top center of the container 106 as shown in FIG. 4.

Figure 16:
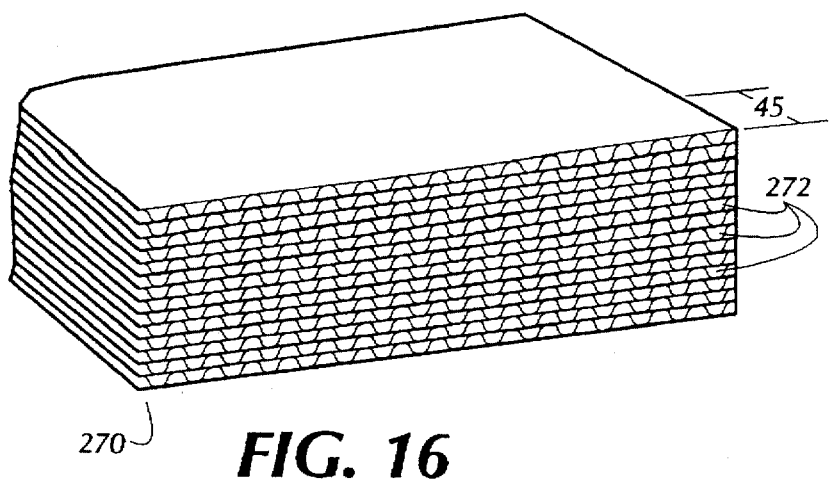
FIG. 16 is a perspective view of billet formed of corrugated paperboard sheets.
Figure 17:
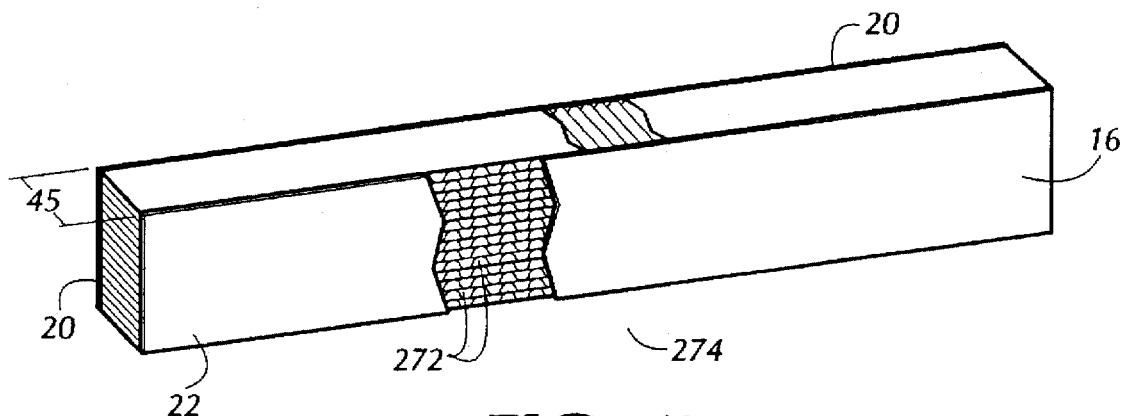
FIG. 17 is a perspective view of a plank cut from the billet illustrated in FIG. 16 and finished with caps.

FIG. 16 is a perspective view of a preferred billet 270 formed of layers of double-wall corrugated paperboard sheets 272 adhered together. This embodiment does not include fibre sheets 16 as shown in FIG. 2, and provides a cost effective alternative for plank-style structural members. FIG. 17 is a perspective view of a plank 274 cut from the billet 270 and finished with caps 20 and 22 as discussed above. Such planks are preferably used for deckboards 210 in pallets (see FIG. 12) and cross-pieces such as 119 in FIG. 4.

A preferred embodiment shown in FIG. 16 adheres twenty-two layers of double-wall corrugated sheets together to form the billet 270 having a height of about 5.94 inches. The billet 270 is ripped to width to form core planks of 0.82 inches thick. The core planks are capped with solid fibre caps 20 and 22 on both of the flute-exposed sides, as shown in FIG. 17. The final dimensions of the plank 274 is about 1 inch thick by 6 inches wide. Corrugated sheets typically have a length of 96 inches. The resulting plank 274 is then cut to length for the particular application (i.e., top frame, pallet, and the like). As discussed above, the planks and cleats formed according to the present invention are machinable on conventional wood-cutting equipment.

Figure 18:
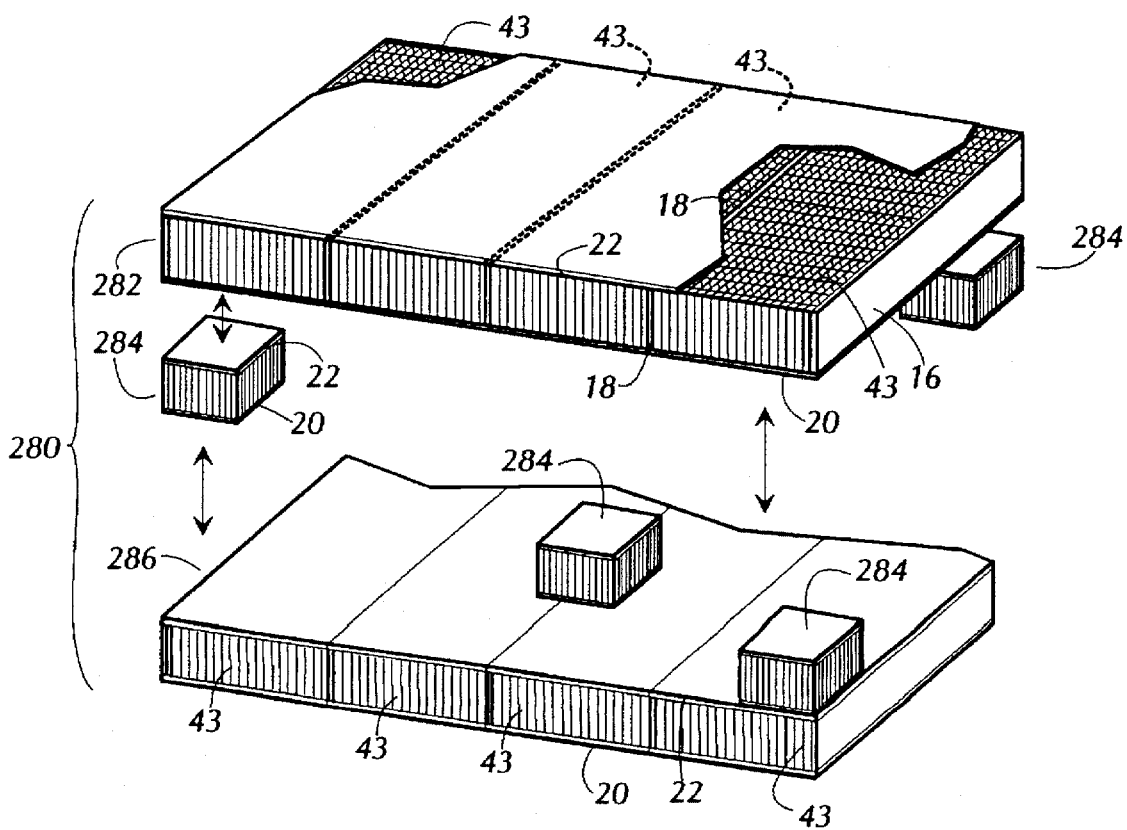
FIG. 18 is a perspective exploded view of a pallet made with planks of the present invention.

FIG. 18 is a perspective exploded view of a pallet 280 made with a planar baseboard 282 and a planar deckboard 286 separated by stringer blocks 284. The baseboard 282 and the deckboard 286 are planar sheets formed of corrugated paperboard planks 43 and fibreboard caps 20 and 22. The planks 43 are placed side-by-side and capped with fibreboard sheets. The fibreboard caps 20 and 22 are adhered with adhesive to the planks 43. The stringer blocks 284 are cut from capped planks 44 discussed above. An upper and a lower surface 289 of each stringer block 284 receives adhesive for joining to the baseboard 282 and the deckboard 286. The thickness 290 of the stringer block 284 defines a gap between the baseboard 282 and the deckboard 286 for receiving forks of a forklift truck.

Figure 19:
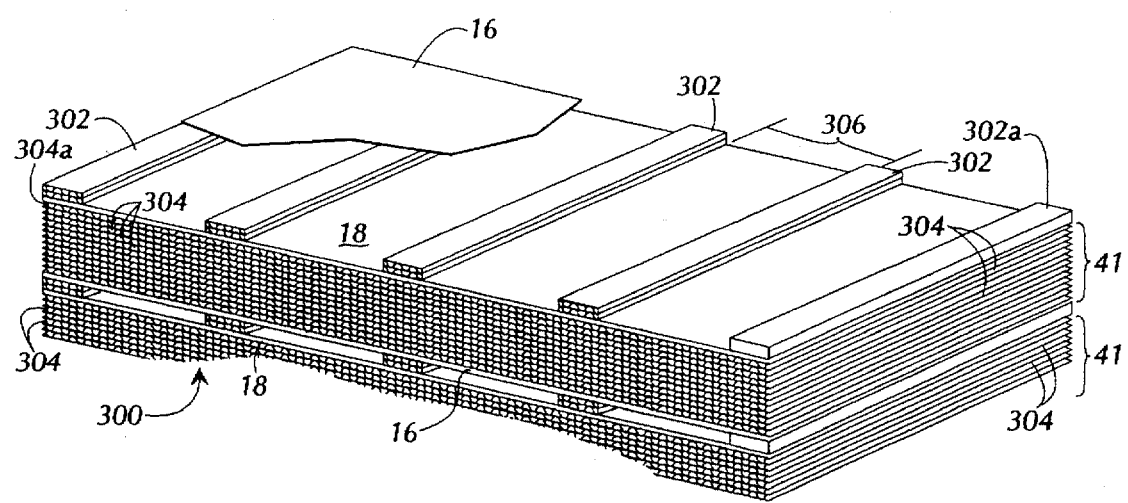
FIG. 19 is a perspective view of a billet according to the present invention.

FIG. 19 illustrates a portion of an alternate embodiment of the billet 40 and is generally referred to as the billet 300. The billet 300 uses spacers 302 instead of the ripout sheets 42 discussed above to separate cores 41. In the illustrated embodiment, the cores 41 comprise layered sheets of double-wall corrugated paperboard 304. The cores 41 include the fibreboard sheets 16 and 18. The spacers 302 comprise narrow lengths of corrugated paperboard. The spacers 302 are positioned spaced-apart on the fiberboard sheet 18 of the core 41. The spacing defines a gap 306 between adjacent spacers 302 and the adjacent cores 41. In the illustrated embodiment, a spacer 302a is made of wood, for a purpose discussed below.

With reference to FIG. 3, the billet 300 is formed by placing a sheet of fibreboard 16 on the roller conveyor 64. A conventional double-side glue coater applies adhesive to both sides of one of the sheets 304 of corrugated paperboard. The sheet 304 is placed on the on the sheet of fibreboard 16. Another sheet of corrugated paperboard is fibreboard 16. Another sheet of corrugated paperboard is placed on the glued face of the previous layer of corrugated paperboard. Another sheet of corrugated paperboard is passed through the double-side glue coater and then placed in sequence in the billet. The use of the double-side glue coater reduces labor to make the pallet. This process continues until the core 41 is formed. A fibreboard sheet is placed on the final glued corrugated paperboard sheet 304a for the core fibre layer 18. The spacers 302 are positioned on the core fibre layer 18. The fibreboard layer 16 for the next core 41 is positioned on the billet 300 and the process continues until the desired number of cores are assembled.

The billet 300 is then pressed to laminate the paperboard sheets together. The spacers 302 compress and after the lamination is complete the spacers re-expand for the ripout layer between adjacent cores 41. The resulting ripout layer includes relatively large spaces between the cores 41. These gaps reduce the materials cost for the billet 300. Smaller amounts of corrugated paperboard are used in the ripout layer and less adhesive is used to hold the ripout layer in the billet. Also, the cutting wear on band saws is reduced.

The billet 300 is passed through the band head rig 74 for cutting core planks 43, as discussed above. In a preferred embodiment, the billet 300 is cut transverse to the direction of corrugation to form planks or beams especially for deckboards and elongated boards. For columns, the billet 300 is cut with the direction of corrugation.

In an alternate embodiment, the ripout layers are preferably pre-formed by adhering the spacers 302 between fibreboard sheets 16 and 18. This sandwich-form ripout layer is readily added to the billet by positioning one on the final double-coated corrugated paperboard sheet 304 in one core 41. The next core 41 is started by double-coating one of the corrugated paperboard sheets 304 and placing on the fiberboard sheet 18.

In the illustrated embodiment, the side spacer 302a is wooden. During lamination, the corrugated paperboard spacers 302 crush and the wood spacer 302a does not. The fibreboard sheets 16 and 18 and the corrugated paperboard sheets 304 taper from the inside edge of the wood spacer 302a. The wood spacer 302a is removed before the billet 300 is ripped or cut through the ripout layer. The removal of the wood spacer 302a creates an opening in the billet 300 for insertion of the band saw blade. The fibreboard sheets 16 and 18 of the adjacent cores 41 guide the travel of the band saw blade.

The principles, preferred embodiments, and modes of operation of the present invention have been described in the foregoing specification. The invention is not to be construed as limited to the particular forms disclosed because these are regarded as illustrative rather than restrictive. Moreover, variations and changes my be made by those skilled in the art without departing from the spirit of the invention as described by the following claims.

What is claimed is:

1. A structural member for making top frames, pallets, and cleats for packaging, said structural member adapted to forming rigid joints by machining and joining with adhesive, comprising:

a core defined by a plurality of stacked corrugated paperboard sheets of liner and flutes bonded adhesively together and comprising a material of a first density, which core provides an interior structure machinable into mating joints for being engaged and bonded to another of the structural members;

at least one support layer comprising a solid fiberboard sheet having a second density greater than the first density disposed in the core between two of the corrugated paperboard sheets; and a pair of caps adhesively bonded to opposed side faces of the core, thereby defining a substantially I-beam structural member of the caps and the support layer with an interior material for dimensioning and jointing of the structural member.

* * * * *